US012190565B2

(12) United States Patent
Tao et al.

(10) Patent No.: US 12,190,565 B2
(45) Date of Patent: Jan. 7, 2025

(54) SYSTEM AND METHOD FOR DOMAIN-AGNOSTIC BIAS REDUCTION WITH SELECTED SAMPLING FOR FEW-SHOT LEARNING

(71) Applicant: CARNEGIE MELLON UNIVERSITY, Pittsburgh, PA (US)

(72) Inventors: Ran Tao, Pittsburgh, PA (US); Marios Savvides, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 18/267,540

(22) PCT Filed: Feb. 3, 2022

(86) PCT No.: PCT/US2022/015093
§ 371 (c)(1),
(2) Date: Jun. 15, 2023

(87) PCT Pub. No.: WO2022/173650
PCT Pub. Date: Aug. 18, 2022

(65) Prior Publication Data
US 2024/0071050 A1   Feb. 29, 2024

Related U.S. Application Data

(60) Provisional application No. 63/148,392, filed on Feb. 11, 2021.

(51) Int. Cl.
*G06K 9/00* (2022.01)
*G06V 10/764* (2022.01)
(Continued)

(52) U.S. Cl.
CPC ........ *G06V 10/7715* (2022.01); *G06V 10/764* (2022.01); *G06V 10/771* (2022.01)

(58) Field of Classification Search
CPC ............ G06V 10/7715; G06V 10/764; G06V 10/771; G06V 10/82; G06V 40/165; G06V 40/172; G06N 7/01; G06N 20/00
See application file for complete search history.

(56) References Cited

U.S. PATENT DOCUMENTS 10,354,159 B2 *  7/2019  Savvides ................ G06V 10/25
2019/0042875 A1   2/2019  Carr
(Continued)

OTHER PUBLICATIONS

Zhang et al., "CANet: Class-Agnostic Segmentation Networks with Iterative Refinement and Attentive Few-Shot Learning" arXiv:1903.02351 [cs.CV] Mar. 6, 2019.
(Continued)

*Primary Examiner* — Duy M Dang
(74) *Attorney, Agent, or Firm* — KDW Firm PLLC

(57) ABSTRACT

Disclosed herein is a methodology for refining novel-class features in a few-shot learning scenario by fine-tuning the feature extractor by reducing both class-agnostic biases and class-specific biases. A distribution calibration module is used to reduce the class-agnostic bias by normalizing the overall feature distribution for novel classes and further reshaping the feature manifold for fast adaptation during fine-tuning. Selected sampling is used to reduce class-specific bias by augmenting more data for better estimation.

14 Claims, 5 Drawing Sheets

(51) Int. Cl.
    *G06V 10/77*     (2022.01)
    *G06V 10/771*     (2022.01)

(56) References Cited

U.S. PATENT DOCUMENTS

| | | |
|---|---|---|
| 2019/0095705 A1 | 3/2019 | Yu |
| 2019/0205694 A1 | 7/2019 | Wang |
| 2020/0242736 A1 | 7/2020 | Liu |
| 2021/0073665 A1* | 3/2021 | Zhong .................... G06N 3/088 |

OTHER PUBLICATIONS

International Search Report and Written Opinion for the International Application No. PCT/US22/15093, mailed May 12, 2022, 8 pages.
International Preliminary Report on Patentability for the International Application No. PCT/US2022/015093, mailed Aug. 24, 2023, 8 pages.

* cited by examiner

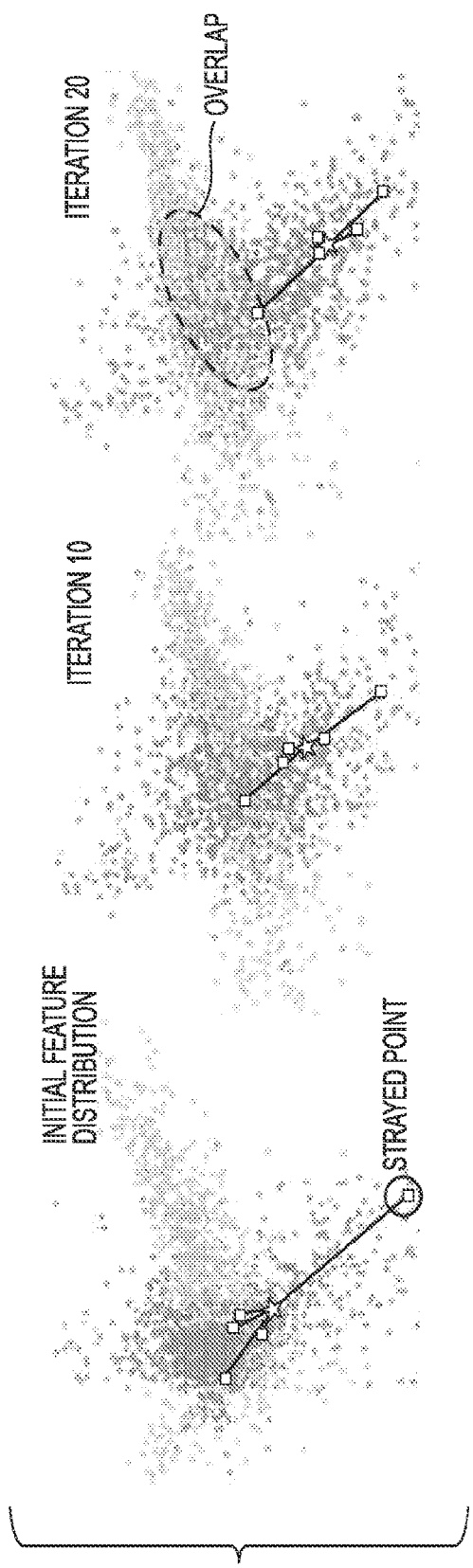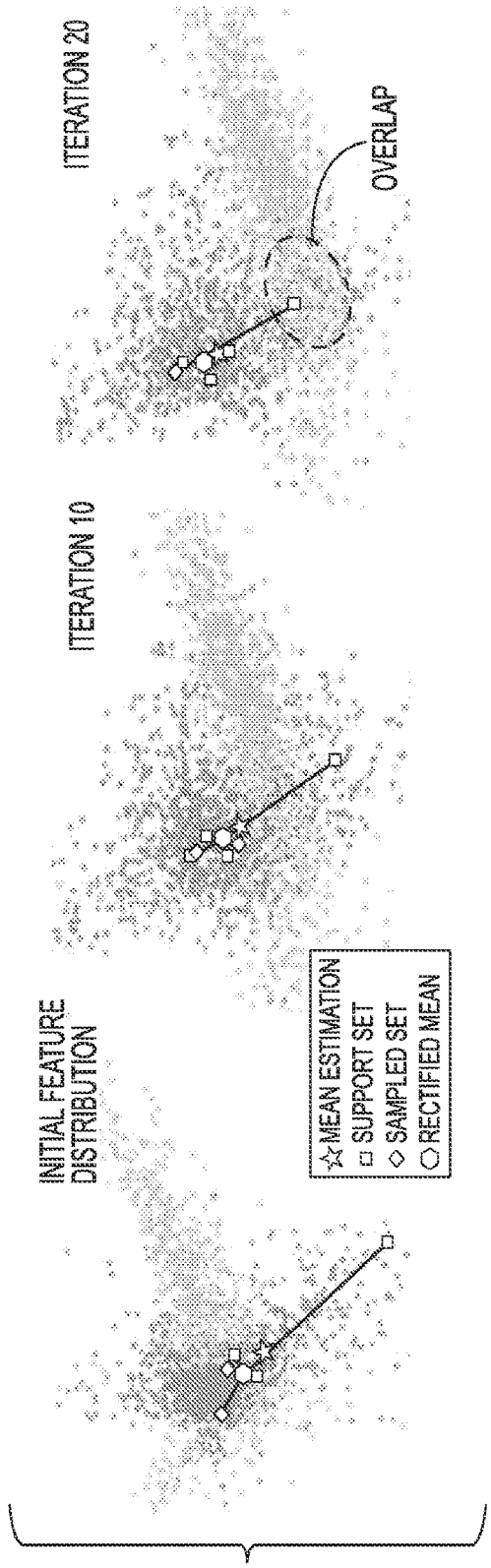
FIG. 4A
FIG. 4B

ALGORITHM 1 : RECTIFY CLASS PROTOTYPES BY SELECTING SAMPLING

1: procedure A SUPPORT SET  $(D_S = \{(x_i, y_i)\}_{i=1}^{N_S}, (x,y)$ IS THE BATCH OF SUPPORT SET, $y_i \in C$)
2:     for $t \in \{0, \ldots, T\}$ do
3:         $z = f_\theta(x)$
4:         for $c \in C$ do
5:             $index = index(y == c)$
6:             $w_c = \frac{1}{K} \sum_{y \in i} z[index]$
7:         $z_0 \leftarrow z$
8:         $z_t \leftarrow z, y_t \leftarrow y$
9:         for $z_i, y_i \in (z,y)$ do
10:             while True do:
11:                 Sample $z_i'$ from $z_i', \sim N(z_i, \Sigma)$
12:                 $p(y_i|z_i') = \frac{\exp\langle w_{y_i}, z_i'\rangle}{\sum_{j=1}^{C_t} \exp\langle w_j\, z_i'\rangle}$
13:                 $p(y_i|z_i) = \frac{\exp\langle w_{y_i}, z_i\rangle}{\sum_{j=1}^{C_t} \exp\langle w_j\, z_i\rangle},$
14:                 if $p(y_i|z_i') > p(y_i|z_i)$ then
15:                       $z \leftarrow [z_t; z_i'], y_t \leftarrow [y_t; y_i]$    ▷ Accept
16:                       $z_i = z_i'$
17:                 else
18:                       Break    ▷ Reject
19:         for $c \in C$ do
20:             $index = index(y_t == c)$
21:             $w_c' = \frac{1}{K} \sum_{y \in i} z_t[index]$    ▷ Recompute w

FIG. 6

SYSTEM AND METHOD FOR DOMAIN-AGNOSTIC BIAS REDUCTION WITH SELECTED SAMPLING FOR FEW-SHOT LEARNING

RELATED APPLICATIONS

This application claims the benefit of U.S. Provisional Patent Application No. 63/148,392, filed Feb. 11, 2021, the contents of which are incorporated herein in their entirety.

BACKGROUND

The importance of utilizing a good feature embedding in few-shot learning is well studied and addressed. A feature embedding is pre-trained as a classification task using meta-training dataset (base classes). Fine-tuning on the meta-test dataset (novel classes) is known to surpass most meta-learning methods. However, only finetuning a classifier on the meta-test dataset leaves the feature embedding unchanged.

A pre-trained feature extractor is sufficient to have well-defined feature distributions on base classes, while this is not true for novel classes. Novel classes may come from a variety of domains different from base classes. Globally, initial feature distributions of novel classes could be affected mainly by the domain difference. Locally, features are not trained to cluster tightly within a class and separate well between classes, which intensifies the biased estimation of only a few samples. Those biases in novel-class feature distributions show the importance of refining novel-class features.

SUMMARY

Utilizing a deep network trained on a meta-training dataset serves as a strong baseline in few-shot learning. In the disclosed invention novel-class features are refined by fine-tuning the feature extractor on the meta-test set using only a few samples. Biases in novel-class feature distributions are reduced by defining them into two aspects: class-agnostic biases and class-specific biases.

Class-agnostic bias refers to the feature distribution shifting caused by domain differences between novel and base classes. The unrefined features from novel classes could cluster in some primary direction due to the domain difference, which leads to the skewed feature distribution as shown in the left graph in FIG. 1. In other words, the feature distribution of novel classes is shifted by the domain difference when directly using the pre-trained feature extractor.

Class-specific bias refers to the biased estimation using only a few samples in one class. Biased estimation is always critical for few-shot learning. By only knowing a few samples, the estimation of feature distribution within one class is biased as shown in the left portion of FIG. 2. The bias between empirical estimation with its true value would be reduced with more samples involved. Running sampling under each class distribution is the most direct way to enlarge the support set. However, this is not applicable when each class distribution is unknown.

The disclosed invention provide a Distribution Calibration Module (DCM) to reduce class-agnostic bias. DCM is designed to eliminate domain difference by normalizing the overall feature distribution for novel classes and further reshaping the feature manifold for fast adaptation during fine-tuning. The results are shown in the right graph of FIG. 1. By eliminating the domain difference through distribution calibration, DCM boosts performance on datasets from different domains, demonstrating the importance of reducing class-agnostic bias when dealing with domain issues.

For class-specific bias, the disclosed invention implements Selected Sampling (SS) to augment more data for better estimation. More specifically, SS happens on a chain of proposal distributions centered with each data point from the support set. The whole sampling process is guided by an acceptance criterion wherein only samples beneficial to the optimization will be selected. The results of applying SS is shown in the right portion of FIG. 2. Reducing class-specific bias with SS can further enhance the finetuning performance by a large margin. Without inferring the actual feature distribution, SS effectively explores unknown feature space and augments features to reduce class-specific bias in estimation.

BRIEF DESCRIPTION OF THE DRAWINGS

By way of example, a specific exemplary embodiment of the disclosed system and method will now be described, with reference to the accompanying drawings, in which:

FIG. 4 is an illustration of feature distributions without selected sampling (a) and with selected sampling (b).

FIG. 6 is a meta-language listing of one possible embodiment of an algorithm used for selected sampling.

DETAILED DESCRIPTION

Figure 1:
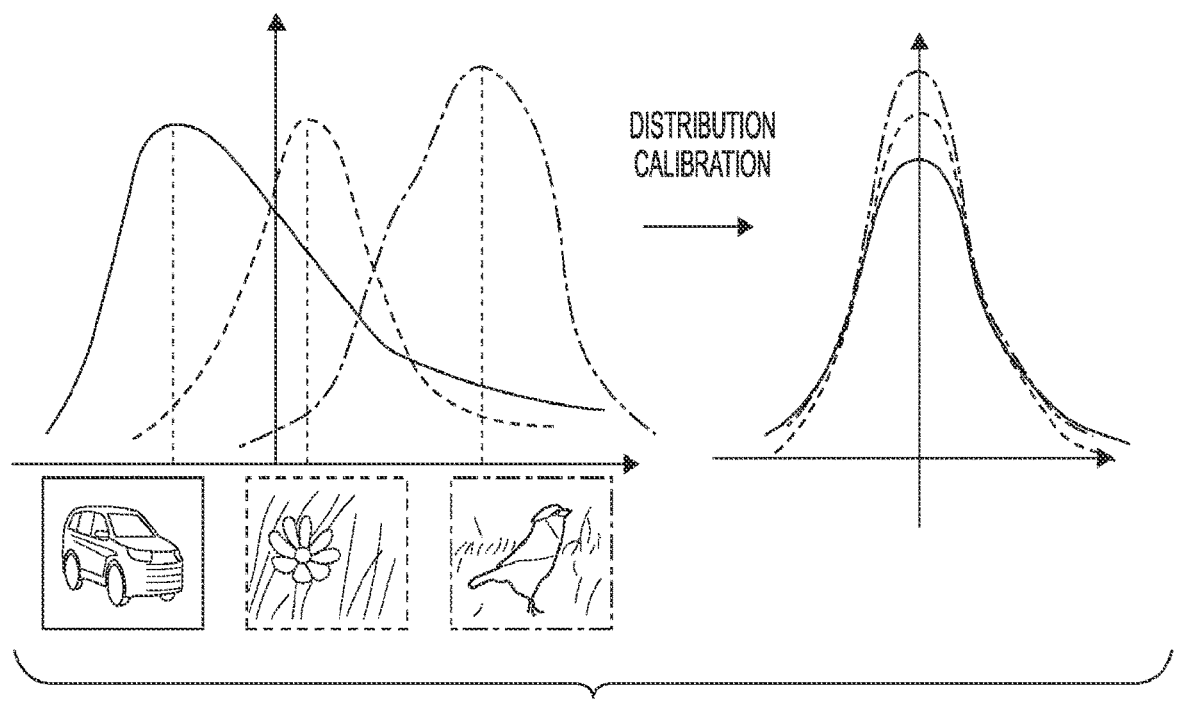
FIG. 1 illustrates class-agnostic bias (left) and a correction accomplished by the disclosed invention (right).
Figure 2:
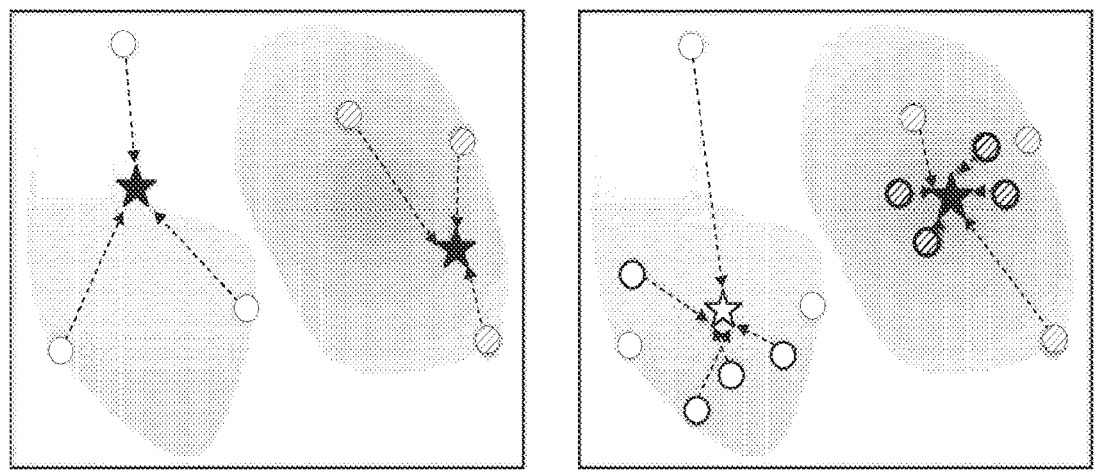
FIG. 2 illustrates class-specific bias (left) and a correction accomplished by the disclosed invention (right).

To explain the invention, the few-shot classification setting is formalized with notation. Let (x, y) denote an image with its ground-truth label. In few-shot learning, training datasets and testing datasets are referred to as the support and query set respectively and are collectively called a C-way K-shot episode. The training (support) dataset is denoted as $\mathcal{D}_s = \{(x_i, y_i)\}_{i=1}^{N_s}$ and the testing (query) dataset is denoted as $\mathcal{D}_q = \{(x_i, y_i)\}_{i=1}^{q}$, where $y_i \in C$ and $|C|$ is the number of ways or classes and $N_s = C \times K$.

For supervised learning, a statistics $\theta^* = \theta^*(\mathcal{D}_s)$ is learned to classify $\mathcal{D}_s$ as measured by the cross-entropy loss:

$$\theta^*(\mathcal{D}_s) = \arg\min_\theta \frac{1}{N_s} \sum_{(x,y) \in \mathcal{D}_s} -\log p_\theta(y|x) \qquad (1)$$

where:

$p_\theta(\cdot|x)$ is the probability distribution on C as predicted by the model in response to input x.

More specifically:

$$p(y=k|x) = \frac{\exp\langle w_k, f_\theta(x)\rangle}{\sum_{j=1}^{C} \exp\langle w_j, f_\theta(x)\rangle} \qquad (2)$$

where:

$\langle \cdot \rangle$ refers to the dot-product between features with class prototypes.

The novel class prototype $w_c$, $c \in C$ is the mean feature from the support set $\mathcal{D}_s$:

$$w_c = \frac{1}{N_s} \sum_{x \in \mathcal{D}_s} f_\theta(x) \quad (\text{x})$$

Herein, $f_\theta(x)$ is first pre-trained with the meta-training dataset using cross-entropy loss and further, in each testing episode, $\theta^* = \theta^*(\mathcal{D}_s)$ is learned by finetuning $f_\theta(x)$ using $\mathcal{D}_s$. Given a test datum x where $(x, y) \in \mathcal{D}_q$, y is predicted:

$$\hat{y} = \underset{c}{\mathrm{argmax}}\, p_{\theta^*}(c|x) \quad (4)$$

With this basic finetuning framework, the Distribution Calibration Module and Selected Sampling will now be discussed.

Distribution Calibration Module—The disclosed invention inserts a plug-in distribution calibration module (DCM) following a feature extractor to reduce class-agnostic bias caused by domain differences.

The first step in reducing class-agnostic bias is to calibrate the skewed feature distribution. A pre-trained feature extractor $f_\theta(x)$ provides an initial feature space wherein general invariant features are learned from a large-scale dataset. $\theta^* = \theta^*(\mathcal{D}_{base})$ is sufficient to classify those base classes, which makes it inadequate for distinguishing novel classes. The overall feature distribution of novel classes may be skewed due to its domain property. The feature distribution could be described statistically:

$$\mu = \frac{1}{N_s} \sum_{x_i \in \mathcal{D}_s} f_\theta(x_i) \text{ and} \quad (5)$$

$$\sigma = \frac{1}{N_s} \sum_{x_i \in \mathcal{D}_s} (f_\theta(x_i) - \mu)^2$$

where:
μ and σ are class-agnostic parameters describing the feature distribution for all obtained novel classes (e.g., the mean and standard deviation of the feature distributions of the novel classes).

For feature distributions that are skewed in some directions, the μ and σ presented could be far from the normal distribution. They are first applied to calibrate the distribution to approach a zero-centered mean and unit standard deviation:

$$\frac{f_i - \mu}{\sigma}.$$

This distribution calibration by feature normalization helps correct the skewed directions brought by large domain differences between base and novel classes.

Fast feature adaptation is enabled during fine-tuning. For a feature vector, there are locations encoding class-sensitive information and locations encoding common information. Values on class-sensitive locations are expected to vary between classes to distinguish them. Similar values are obtained from common locations among all samples, representing some domain information but contributing little to classification. By this normalization, those locations that encode class-sensitive features stand out compared with the locations encoding common information.

Additionally, the calibrated feature embedding is multiplied element-wise by a scale vector:

$$\overline{f}_\theta(x_i) = \frac{f_i - \mu}{\sigma} * s \quad (6)$$

where:

$f_i = f_\theta(x_i)$;

and
* is the element-wise multiplication.

Figure 3:
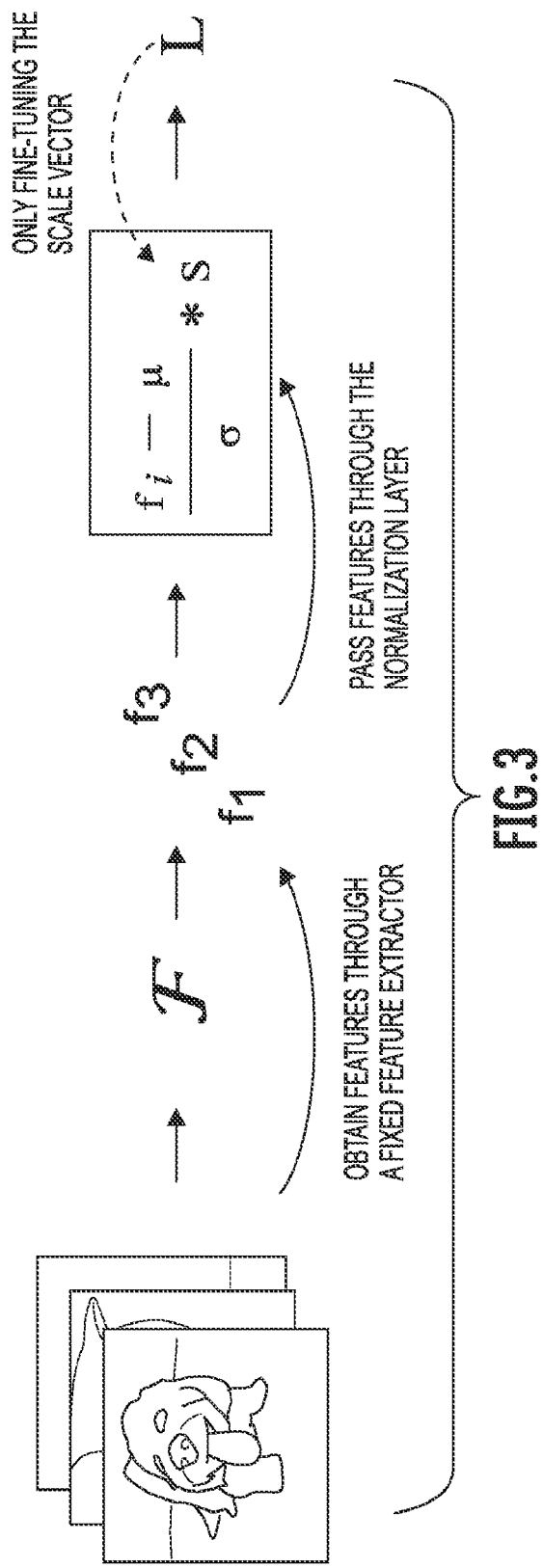
FIG. 3 is an illustration of the application of a scaling vector to the calibrated feature embeddings.

This is illustrated in FIG. 3. The scale vector s is learnable during fine-tuning. The element-wise multiplication allows each location on the scale vector to be optimized independently, and, thus, the whole feature embedding could be reshaped on novel classes by the scale vector.

As s is multiplied element-wise with $f_i$, only the partial derivative at a single location on the feature vector is shown. In the 1-shot case with mean features as class prototypes, the gradient is specified by:

$$\frac{\partial L_i}{\partial s} \propto \frac{f_i - \mu}{\sigma}\left[(p(y_i|x) - 1)\frac{f_i - \mu}{\sigma} + \sum_{j \neq y_i}^{C} p(j|x)\frac{f_j - \mu}{\sigma}\right] \quad (7)$$

After applying the distribution calibration on $f_i$ and $f_j$, the gradients of s for the class-sensitive locations have relatively larger values than the common ones. The difference between features is further addressed and enlarged correspondingly through gradient-based optimization. And the feature manifolds will adapt quickly to a shape where distinguished parts are amplified.

Selected Sampling—Selective sampling is used to reduce class-specific bias. Biased estimation in a class inevitably hinders the optimization of features. The gradient for feature f of (x, y) during finetuning is:

$$\frac{\partial L_i}{\partial f} = (p(y|x) - 1)w_y + \sum_{j \neq y}^{C} p(j|x)w_j \quad (8)$$

As $p(y|x) \leq 1$, the optimization of the gradient descent focuses f moving close towards the direction of $w_y$, its ground-truth class prototypes. For a class c, a mean feature from the support set is used as the class prototype when computing the predicted probability:

$$w_c = \frac{1}{N_s} \Sigma_{x \in \mathcal{D}_s} f_\theta(x). \quad (\text{x})$$

This is the empirical estimation of mean using the support set. The true mean from the class distribution is denoted as $m_c$. The bias term $\delta_c$ between empirical estimation with its true value is defined as:

$$\delta_c = w_c - m_c \quad (9)$$

For few-shot learning, as the w is estimated from a small number of data, c is indeed not neglectful. As defined in Eq. (9), $w_y$ can be replaced by $\delta_c + m_y$. Then, the gradient of feature f is given by:

$$\frac{\partial L_i}{\partial f} = (p(y|x)-1)\delta_y + (p(y|x)-1)m_y + \sum_{j \neq y}^{C} p(j|x)w_j \quad (10)$$

The optimization of f towards its class prototype w y can be factorized into two parts: one part, $(p(y|x)-1)\delta_y$, dominated by the bias and the other part, $(p(y|x)-1)m_y$, dominated by the true mean. Ideally, features are expected to tightly cluster around m for a refined feature distribution. However, $(p(y|x)-1)\delta_y$ in the gradient distracts the optimization of f by moving it close to the bias, which hinders its approaching to the true mean. This inevitably impedes the optimization for few-shot learning.

As shown in FIG. 4(a), points in the support set could stray from a majority in the class distribution. The stray points enlarge the bias in estimation, and thus during optimization, the clustering of the feature distribution is distracted by the bias.

Augmenting more data is an efficient way to reduce bias. If more features could be sampled and added to the sequence of computing the class prototype within one class, the effects caused by the bias are vastly reduced. However, the feature distribution is unknown for each class, which disables the direct sampling from that distribution.

Figure 5:
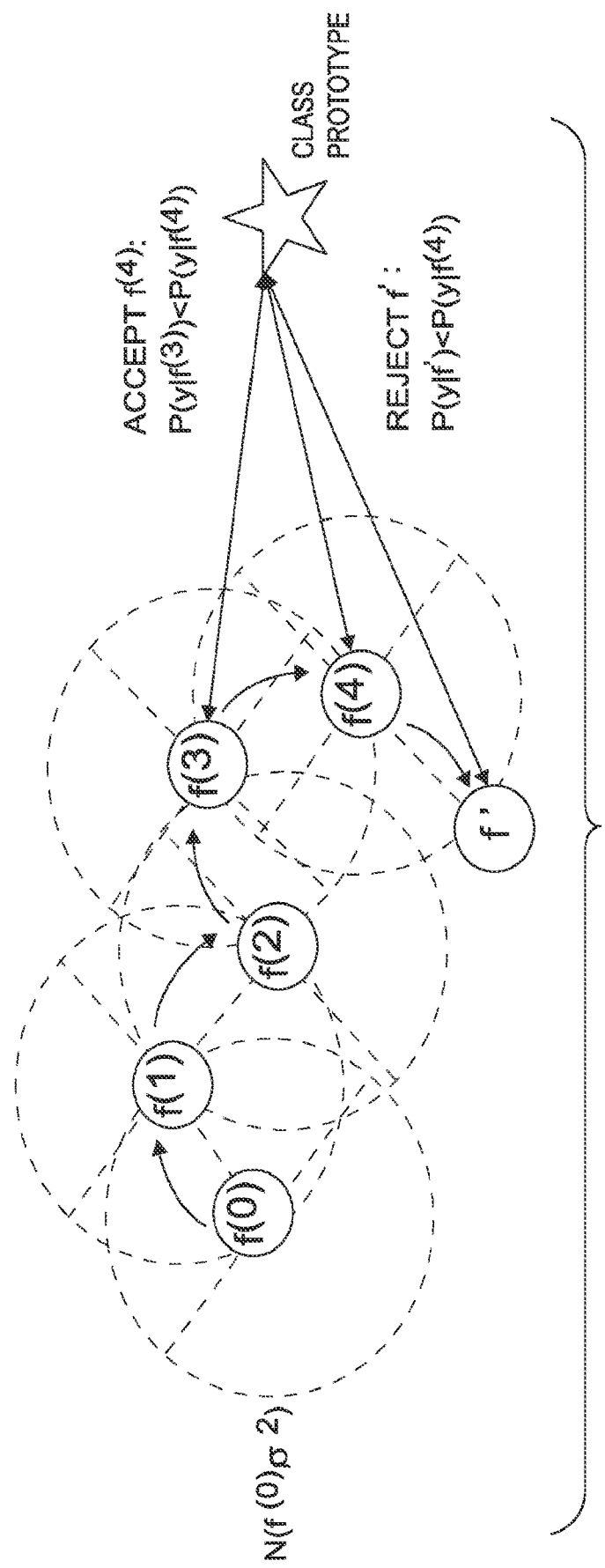
FIG. 5 is an illustration of the selected sampling method.

Without the inferring of actual feature distribution, the selected sampling guides a Monte-Carlo sampling under a proposal distribution. By taking advantage of each known data in the support set and allowing these few samples to guide the direction of a Monte-Carlo sampling, features are directly augmented into the support set to reduce the bias in estimation. For each known data point $(x_i, y_i)$ the corresponding vector in the feature space is denoted as $f_i$. A proposal distribution Q $(f'|f) = \mathcal{N}(f_i, \Sigma)$ is used to sample $f'_i$, and p(y|f) is a deterministic variable as the predicted logits from the classifier given a feature f. The sampled points are queried by the criterion $p(y_i|f'_i) > p(y_i|f_i)$ in determination of acceptance. If accepted, $f'_i$ becomes the new starting feature point where the next sampling step is run using proposal distribution $N(f'_i, \sigma^2)$. If rejected, the sampling process for $(x_i, y_i)$ terminates. The sampling process is illustrated in FIG. 5. With one feature $f^{(0)}$ in the support set as an initial point, a new $f^{(1)}$ is drawn from the proposal distribution $N(f^{(0)}, \sigma^2)$. Once $f^{(1)}$ is accepted, it becomes the next point for another sampling step. The sampling process terminates upon seeing one rejected point. The already sampled points $f^{(1)}, f^{(2)}, \ldots, f^{(n)}$ will be appended to the support sets for updating the mean estimation.

A meta-language listing of an exemplary embodiment of an algorithm for each epoch update of the selected sampling method is shown in FIG. 6.

The proposal distribution ensures that samples are drawn from the vicinity around the known point during the process. $\mathcal{N}(f_i, \Sigma)$ is a multivariate Gaussian distribution centered with $f_i$. The covariance matrix $\Sigma$ is an identity matrix scaled with a hyper-parameter $\sigma$, which allows each location on features to be sampled independently. However, the proposal distribution is only a random walk process which brings no further constraints on the sampled points. With a feature $f=f_\theta(x)$, the acceptance criterion is whether the sampled feature will have a more significant predicted probability of belonging to the ground-true class or not, which is if $p(y_i|f'_i) > p(y_i|f_i)$:

$$\frac{\exp\langle w_k, f'_i \rangle}{\sum_{j=1}^{C} \exp\langle w_j, f'_i \rangle} > \frac{\exp\langle w_k, f_i \rangle}{\sum_{j=1}^{C} \exp\langle w_j, f_i \rangle} \quad (11)$$

where:
  $\exp\langle w_k, f_i \rangle$ represents the distance between a feature with its class prototype; and
  $\sum_{j=1}^{C} \exp\langle w_j, f_i \rangle$ represents the overall distance between a feature with all class prototypes.

This criterion indicates that a sampled point is accepted under the case either closer to its class prototype or further away from other classes in the high-dimensional feature space. Either way, the accepted point is ensured to provide helpful information that avoids the disadvantages of random walk sampling. This selected sampling on the feature space allows exploration of unknown feature space while still controlling the quality of sampling to optimize.

As shown in FIG. 4(b), by enlarging the support set with selected samples, the bias in mean estimation is reduced. Selected sampling is an ongoing process for each iteration that helps to enhance the feature distribution clustering.

Disclosed herein is a novel, effective method to power fine-tuning in few-shot learning. By reducing biases in the novel-class feature distribution, the effect of fine-tuning is boosted over datasets from different domains. Without any meta-training process, the fast feature adaptation can also be achieved by better understanding biases in feature distribution for few-shot learning.

As would be realized by one of skill in the art, the disclosed method described herein can be implemented by a system comprising a processor and memory, storing software that, when executed by the processor, performs the functions comprising the method.

As would further be realized by one of skill in the art, many variations on implementations discussed herein which fall within the scope of the invention are possible. Moreover, it is to be understood that the features of the various embodiments described herein were not mutually exclusive and can exist in various combinations and permutations, even if such combinations or permutations were not made express herein, without departing from the spirit and scope of the invention. Accordingly, the method and apparatus disclosed herein are not to be taken as limitations on the invention but as an illustration thereof. The scope of the invention is defined by the claims which follow.

The invention claimed is:

1. A method of fine-tuning a few shot feature extractor in a classifier trained on a dataset of base classes to reduce biases in novel class feature distribution of the feature extractor caused by an introduction of one or more novel classes, comprising:
  inputting few images in each novel class to the feature extractor;
  reducing class-agnostic biases in the novel class feature distributions caused by domain differences between the base classes and the novel classes; and
  reducing class-specific biases in the novel class feature distribution caused by using only a few samples in the novel classes by selected sampling wherein only samples beneficial to determining the novel class are selected;
  wherein class-agnostic bias is feature distribution shifting caused by domain differences between the novel and base classes; and
  wherein class-specific bias is the biased estimation resulting from using only a few samples in one class.

2. The method of claim 1 wherein the few shot feature extractor includes a distribution calibration module to reduce the class-agnostic biases, the distribution calibration module including:

normalizing the novel class feature distributions of the feature extractor to approach a zero-centered mean; and multiplying the normalized novel class feature distributions by a scaling vector to re-shape the novel class feature distributions.

3. The method of claim 2 wherein the novel class feature distributions are normalized based on a mean and a standard deviation of the feature distribution.

4. The method of claim 3 wherein the distribution calibration module performs an element-wise multiplication of the novel class feature distributions of the feature extractor by the scaling vector.

5. The method of claim 3 wherein the scaling vector is learnable during fine-tuning.

6. The method of claim 4 wherein each element of the scaling vector is learned independently.

7. The method of claim 2 wherein the steps of the method operate on a combined feature distribution of the base classes and the novel classes.

8. The method of claim 1 wherein selected sampling enlarges a support set for novel classes.

9. The method of claim 1 wherein the selective sampling further comprises, iteratively:
  selecting a feature in the support set;
  determining a proposed distribution based on the selected feature;
  selecting a new feature from the proposed distribution;
  applying an acceptance criteria to the new feature, and, if accepted, adding the new feature to the support set;
  using the new feature and to determine new proposed distribution; and
  repeating the iteration until a new feature not meeting the acceptance criteria is selected.

10. The method of claim 9 wherein the new feature is selected from the proposed distribution using Monte Carlo sampling.

11. The method of claim 10 wherein the acceptance criteria determines if the selected feature has a higher probability of belonging to a class prototype of the novel class or a lower probability of belonging to all class prototypes in the feature distribution.

12. The method of claim 11 wherein the class prototype is used as a weight of its novel class in the classifier and is computed as an average feature of the novel class from the support set.

13. A method of fine-tuning a few shot feature extractor trained on a dataset of base classes to reduce biases in novel class feature distribution of the feature extractor caused by the introduction of one or more novel classes, comprising:
  inputting few images in each novel class to the feature extractor;
  normalizing the novel class feature distributions of the feature extractor to approach a zero-centered mean;
  multiplying the normalized novel class feature distributions by a scaling vector to re-shape the novel class feature distributions; and
  performing selected sampling of features to enlarge a support set for the novel classes, wherein only samples beneficial to determining the novel class are selected.

14. A system comprising:
  a processor; and
  memory, storing software that, when executed by the processor, performs the method of claim 13.

* * * * *